United States Patent
Szilagyi et al.

(10) Patent No.: US 10,805,837 B2
(45) Date of Patent: Oct. 13, 2020

(54) CONTEXT AWARE AND ADAPTIVE QOS/QOE TARGET DEFINITION IN 5G

(71) Applicant: Nokia Technologies Oy, Espoo (FI)

(72) Inventors: Peter Szilagyi, Budapest (HU); Csaba Vulkan, Budapest (HU)

(73) Assignee: Nokia Technologies Oy, Espoo (FI)

( * ) Notice: Subject to any disclaimer, the term of this patent is extended or adjusted under 35 U.S.C. 154(b) by 15 days.

(21) Appl. No.: 16/091,500

(22) PCT Filed: Apr. 4, 2016

(86) PCT No.: PCT/US2016/025921
§ 371 (c)(1),
(2) Date: Oct. 4, 2018

(87) PCT Pub. No.: WO2017/176247
PCT Pub. Date: Oct. 12, 2017

(65) Prior Publication Data
US 2019/0364457 A1    Nov. 28, 2019

(51) Int. Cl.
*H04W 28/10* (2009.01)
*H04L 12/851* (2013.01)

(52) U.S. Cl.
CPC ......... *H04W 28/10* (2013.01); *H04L 47/2441* (2013.01)

(58) Field of Classification Search
CPC .... H04W 28/10; H04W 4/00; H04L 47/2441; H04L 41/5025; H04L 47/2425; H04L 47/2475; H04L 47/803
See application file for complete search history.

(56) References Cited

U.S. PATENT DOCUMENTS 8,108,520 B2   1/2012   Ruutu et al.
8,948,007 B2   2/2015   Tan et al.
(Continued)

FOREIGN PATENT DOCUMENTS

CN    103945464 A    7/2014

OTHER PUBLICATIONS

Alia, Mourad, and Marc Lacoste. "An adaptive quality of experience framework for home network services." Communication Theory, Reliability, and Quality of Service (CTRQ), 2010 Third International Conference on. IEEE, Jun. 13-19, 2010, (7 pages).
(Continued)

*Primary Examiner* — Afshawn M Towfighi
(74) *Attorney, Agent, or Firm* — Mintz Levin Cohn Ferris Glovsky and Popeo, P.C.

(57) ABSTRACT

Methods and apparatus, including computer program products, are provided for QoS/QoE management. In some example embodiments, there may be provided a method. The method may include receiving, at an adaptive quality controller, an indication of a classification of an application, when a session of the application is detected; receiving, in response to the received indication, a policy associated with the classification and context information regarding at least the application; determining, based on the received policy and the context information, a quality of experience target for the session; mapping, by the adaptive quality controller, the quality of experience target to a quality of service parameter; and providing, by the adaptive quality controller, the quality of experience target to an application scheduler and/or the quality of service parameter to a packet scheduler. Related apparatus, systems, methods, and articles are also described.

18 Claims, 9 Drawing Sheets

(56) References Cited

U.S. PATENT DOCUMENTS

| | | |
|---|---|---|
| 2014/0016464 A1 | 1/2014 | Shirazipour et al. |
| 2015/0043336 A1 | 2/2015 | Zhu |
| 2015/0215832 A1 | 7/2015 | Fitzpatrick |
| 2015/0230152 A1 | 8/2015 | Raleigh et al. |
| 2016/0025921 A1 | 1/2016 | Park |
| 2019/0364457 A1 | 11/2019 | Szilagyi |

OTHER PUBLICATIONS

Alreshoodi, Mohammed, and John Woods, "Survey on QoE\QoS correlation models for multimedia services." arXiv preprint arXiv:1306.0221, May 2013, (20 pages).

Gómez, Gerardo, et al., "Towards a QoE-driven resource control in LTE and LTE-A networks." Journal of Computer Networks and Communications, vol. 2013, Dec. 2012, (16 pages).

Sharma, Dinesh, and R. K. Singh, "QoS & QoE management in wireless communication system." International Journal of Engineering Science and Technology 3.3, Mar. 2011, (7 pages).

| Native telecommunications[1] | | | | |
|---|---|---|---|---|
| Voice | 100 ms | < 1 ms | 0- 1% | codec rate (e.g., AMR) |
| Video | 150 ms | < 1 ms | 0- 0.1% | codec rate (e.g., H.263) |
| QoS parameters | delay | jitter | loss | throughput |

[1] - values are examples according to 3 GPP TS23.203

| OTT | | | | |
|---|---|---|---|---|
| (A) Real time multimedia streaming | media rate + overhead | Very steady pacing for low jitter | | low delay | no loss |
| (B) Stored multimedia | media rate + overhead | on average over RTT | Extra BW for incubation and pre-buffering acceleration | on average over RTT | no loss |
| (C) Interactive data | | | content/app specific target download time based | requires BW in bursts | no loss |
| (D) Messaging/ transactional | | | | low delay | no loss |
| The QoE targets are achieved through application type and session specific QoS parameter configuration. | | | | | |

QoS parameters: throughput, scheduling frequency { minimum capacity grant }, throughput, scheduling frequency { target capacity grant }, scheduling delay budget, urgency, urgency, discard sensitivity

CONTEXT AWARE AND ADAPTIVE QOS/QOE TARGET DEFINITION IN 5G

CROSS REFERENCE TO RELATED APPLICATIONS

This application is a national-phase entry of Patent Cooperation Treaty Application No. PCT/US2016/025921 filed Apr. 4, 2016, entitled "CONTEXT AWARE AND ADAPTIVE QOS/QOE TARGET DEFINITION IN 5G," the contents of which are hereby incorporated by reference in their entirety.

FIELD

The subject matter disclosed herein relates to wireless communications.

BACKGROUND

Networks use quality of service (QoS) parameters to ensure that certain traffic types are handled in a certain way to provide a certain, threshold amount of QoS. For example, a given traffic flow may be classified by certain, generally static QoS parameters, such as guaranteed bit rate (GBR), non-guaranteed bit rate (non-GBR), priority handling, packet delay budget, packet error loss rate, and/or the other parameters. When a traffic flow has a certain QoS parameter, it may for example be forwarded via a radio bearer that can carry traffic according to the QoS parameter. Quality of Experience (QoE) represents a measure or indication of quality from the perspective of a user, such as an application-level indication of quality. As such, QoE may take into account the overall application layer performance of traffic between an application at a user equipment and a remote, network server.

SUMMARY

Methods and apparatus, including computer program products, are provided for QoS/QoE management.

In some example embodiments, there may be provided a method. The method may include receiving, at an adaptive quality controller, an indication of a classification of an application, when a session of the application is detected; receiving, in response to the received indication, a policy associated with the classification and context information regarding at least the application; determining, based on the received policy and the context information, a quality of experience target for the session; mapping, by the adaptive quality controller, the quality of experience target to a quality of service parameter; and providing, by the adaptive quality controller, the quality of experience target to an application scheduler and/or the quality of service parameter to a packet scheduler.

In some variations, one or more of the features disclosed herein including the following features can optionally be included in any feasible combination. During execution of the session, feedback information including updated context information may be received. An updated quality of experience target for the session may be determined based on the updated context information. The updated quality of experience target may be mapped, based on the updated context information, to an updated quality of service parameter. The determining and the mapping may be performed from time to time during the session to adaptively update the quality of experience target and/or the quality of service parameter. The context information may include at least one of a location of a user equipment, a state of the application, a time, a type of radio access, and/or a network demand for shared resources. The classification may include at least one of a real-time multimedia classification, a stored media classification, an interactive data classification, a messaging classification, a transactional classification, and/or a background classification. When the classification indicates the application does not provide visibility into user-plane traffic or the policy indicates there is no need to determine the quality of experience target, the adaptive policy controller may bypass the determining the quality of experience target and proceeds to determining of the quality of service target.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

FIG. 8-FIG. 9 depict examples of QoE to QoE parameter mapping, in accordance with some example embodiments;

Figure 1:
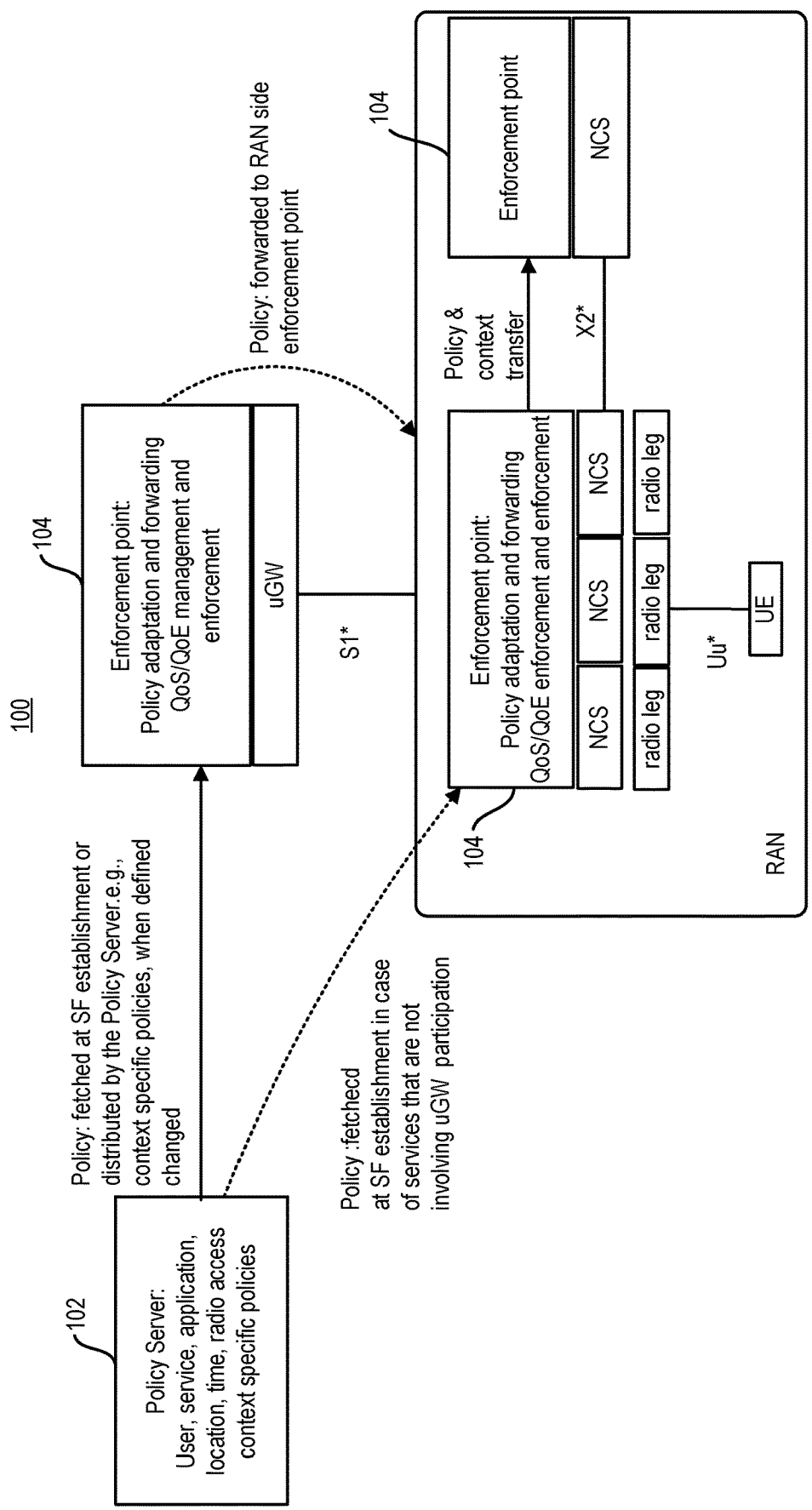
FIG. 1 depicts an example of a QoE architecture, in accordance with some example embodiments.

Like labels are used to refer to same or similar items in the drawings.

DETAILED DESCRIPTION

In some example embodiments, a target QoS and/or a target QoE value may be defined or established for a given session of an application, such as a service, an over-the-top (OTT) application, and/or the like, in a dynamic and adaptive manner. The target QoS/QoE definition may take into account the context of the application, context of the user, network context, and/or the like.

In some example embodiments, there may be provided a QoS/QoE target definition function module (also referred to herein as the QoS/QoE target definition module) that may be logically part of an enforcement point, which can be located in a core network, a radio access network node, a user equipment, and/or other locations. The defined QoE targets may be applied to a session of a given application. The targets may define one or more QoE parameters (for example, download time for web pages, required bandwidth for video session, end-to-end latency per message transaction, and/or the like) and their corresponding QoE target values (or ranges of target values) that, when enforced, ensure a certain quality of experience (QoE) for the application. The QoS targets may indicate lower-level network level parameters such as fairness, delay, loss, jitter targets, and/or the like, which can be applied to an individual flow or a class or set of flows (e.g., flows from the same user, access point, radio access technology, and/or the like).

In some example embodiments, QoE targets for an application session may be derived autonomously based on policies, network operator polices, and the like. Alternatively or additionally, the QoE targets for an application session may be derived autonomously based on context information such as the identity of the application. Alternatively or additionally, the QoE targets for an application session may be derived autonomously based on the attributes or context of a specific application session. Alternatively or additionally, the QoE targets for an application session may be derived autonomously based on the user context (e.g., user behavior, user interaction with the application, and/or the like). Alternatively or additionally, the QoE targets for an application session may be derived autonomously based on the network context (e.g., resources usage and availability, load and congestion status, and/or the like). Alternatively or additionally, the QoE targets for an application session may be derived autonomously based on traffic context (e.g., status of other flows/applications that are served by shared resources, and/or the like).

In some example embodiments, the derived QoE targets may serve as a so-called "QoE target definition," which may be enforced by for example an application scheduler configured to detect application sessions and interpret an application's QoE level parameters. The application scheduler may also provide enforcement. The application scheduler may operate at a higher abstraction level in the user-plane traffic mix, when compared to packet level schedulers. For QoE management in the application or OTT domain, the service flows may be grouped according to which individual application session they deliver data to (e.g., a particular web page download, video download, VOID call, and/or the like). For QoE management in a telecommunication system (e.g., IMS voice/video, and/or the like), the identity of the flows can be detected based on the call establishment signaling.

In some example embodiments, the QoE targets of an application session can be mapped to a relevant set of QoS parameters that can be enforced directly by packet level schedulers. In some example embodiments, there may be provided a way to identify the relevant QoS parameters for the QoE targets and define the mapping between the QoE and QoS parameters.

In some example embodiments, the QoS/QoE target definition module may define one or more usable QoE targets. Rather than have dedicated, detailed QoS like metrics, the QoS/QoE target definition module may implement a relatively small quantity of QoE targets that are generic enough to enable formulating the requirements of a large variety of applications. The QoS/QoE target definition module may define QoE target values (or ranges of values) based on context such as certain application session attributes including a high level policy to for example provide a good customer experience for applications. Moreover, the QoS/QoE target definition module may provide for relaxed requirements given certain context such as heavy congestion. The QoS/QoE target definition module may also identify QoS parameters, and may define a mapping between the QoE targets and QoS parameters.

FIG. 1 depicts a block diagram of portions of a QoS/QoE framework 100, in accordance with some example embodiments. The system 100 may include a central policy server 102 and at least one enforcement point 104. The central policy server 102 may store policies associated with applications, services, and/or the like which may be implemented at a user equipment and/or at other network nodes. Specifically, the central policy server 102 may also store, for a given application, specific policies mapped to context information, such as a location of the user equipment, a current context of the application (for example, suffering from buffering delays, suffering from overlong web page downloads, and/or the like), a time, a type of radio access, a network demand for shared resources, the identity of the application, the type of application, and/or the like. Alternatively or additionally, for a given application, specific policies may be mapped to certain network operator preferences.

In some example embodiments, the enforcement point 104 may manage QoS/QoE for a given session of an application by at least adaptively and/or dynamically applying and enforcing the policies in the context of for example actual user plane traffic, services, applications, network status, network resource status, and/or the like. In some example embodiments, the enforcement point 104 may be implemented by the application convergence sub-layer, ACS, although other implementations may be used as well. The enforcement point may access user plane traffic to collect user, service, application, network-specific insight information, execute actions on the traffic itself, and/or control user plane system resources including so-called critical user plane system resources, such as radio bearers, core network resources, transport infrastructure, and/or services (which may be physical or virtual services).

In some example embodiments, the enforcement point 104 may determine (for example, derive) its actions from policies received (or retrieved) from the policy server 102, when a service flow for a given application session is established. On the user-plane (U-plane), the enforcement point may handle the traffic of one or more service flows, and the enforcement point may manage the QoS/QoE for each service flow. For efficient QoS/QoE management, the enforcement point may partition the user-plane flows within a service flow into sub-service flows (SSF). A sub-service flow may correspond to one service flow, and the sub-service flow may represent a logical separation carrying a subset of the service flow's traffic requiring a certain, dedicated QoS/QoE treatment.

In some example embodiments, the enforcement point 104 may, for each service flow and/or subservice flow, autonomously (based on traffic and network context monitoring) define one or more parameters (and the values for those parameters) for a customer experience level and network level policies. The autonomous and adaptive parameter definition may be used, when the network operator has not supplied an explicit detailed, policy defining the parameters. For example, the network operator may provide high-level policy, which may be define QoE targets and may be mapped to QoS target, enabling adaptive/dynamic enforcement as the application session executes. In some example embodiments, adaptive QoS/QoE parameter definition may be provided.

The enforcement point 104 may, as noted, determine its actions from policies, which in turn define target QoE parameters and their corresponding values as well as QoS parameters. In some example embodiments, these policies may be organized into hierarchical abstraction levels, with the first level (1) corresponding to intent level, the second level (2) corresponding to customer experience level, and the third level (3) corresponding to network level policies. The first level policies (which may be defined by a network node or its operator) may describe high-level preferences without specific key performance indicators (KPIs) and numerical targets. For example, a first level policy may provide seamless experience for online video services. The second level policies may define QoE level parameters and values, either derived by the enforcement point from the first level policies and/or defined at a network node (or its network operator). For example, a second level policy may ensure that online video streams start playing no later than 2 seconds after the user has requested the content. The third level policies may include QoS parameters derived from the first and second layer policies or supplied by a network node (or its network operator). These third level polices may be understood by resource management functions such as packet schedulers. Specifically, the third level polices represent the programming/configuration interface to achieve QoS/QoE enforcement through QoS/QoE driven resource allocation. For example, a third level policy may provide no more than 5 Mb/s bandwidth for a specific user flow.

In some example embodiments, an adaptive and/or self-configuring QoS/QoE system may be provided to control and manage the customer experience. The QoS/QoE system may be configured to define, at any given instance of time, QoE/QoS targets based on for example the above-noted hierarchical abstraction levels and based on context information (e.g., information about the application, network, resource demand, and/or the like). Moreover, the QoS/QoE system may be configured to be adaptive and/or context specific on a per application session basis, so that the QoS/QoE level service targets may be determined for each session. As such, an application session may be monitored and the monitored information may be fed back to the QoS/QoE system, so that the QoS/QoE system can take into account the current context of the application session in order to dynamically determine adapted QoS/QoE service targets.

In some example embodiments, the QoS/QoE system (which may be used in networks including 5G networks and/or other types of networks) may be controlled by policies that describe the behavior and high-level targets of the QoS/QoE system. To that end, the QoS/QoE system may use high-level intent based targets (such as a list of applications for which the QoE should be enforced by the system). For example, designated applications may be popular Internet applications such as online video services (e.g., YouTube, Netflix), social sites (e.g., Facebook, Twitter), messaging (e.g., Viber, WhatsApp), or web browsing. In some example embodiments, the enforcement points may be "smart" or "intelligent" in the sense that the enforcement points may autonomously interpret these intent based policy targets and convert the policies to specific QoE/QoS targets at any given instant in time as application sessions and the actual context (e.g., system resources, user-plane traffic mix, content, application status, and/or the like) are detected. For example, the enforcement point may detect that a user started a video download and there is a corresponding high level policy requesting smooth online video experience. The enforcement point may examine the attributes of the specific video session, and may decide that the amount of bandwidth this video needs is 5 megabits per second in order to fulfill the intent of the high level policy. Later on as the video progresses, the enforcement point may dynamically adapt its bandwidth target according to changes in the video resolution in order to keep the high level policy satisfied.

The QoS/QoE system may, in accordance with some example embodiments, include a high-level policy definition server 102 and provide context based QoS/QoE target calculation (by for example QoS/QoE target definition module). This may enable a high degree of diversity for applications and services such as over-the-top (OTT) sessions in terms of required resources for proper customer experience, which may result in pre-defined QoS targets as less relevant or inapplicable (e.g., two sessions of the same application may require different amount of bandwidth by orders of magnitudes). Moreover, shared resources (e.g., transport, radio, and/or other resource for which simultaneous application sessions compete for) may be distributed among the sessions according to the respective demands of the sessions in order to enhance or maximize the customer experience in a particular context (which may also pre-defined QoS targets not applicable). The dependency of the customer experience on the amount of available resources and the demand of individual application sessions may make QoE management a resource and congestion management task. Accordingly, QoE management may seek to maximize the customer experience and to maintain efficient system resource utilization under every load condition.

In some example embodiments, a QoE target may, as noted, be determined adaptively. For example, the QoE target may be adaptively determined for each application based on policies, attributes of a given application session (or its content), an amount of available resources, and/or the context of other applications (for example, so that all applications receive sufficient resources to provide a reasonable or good QoE while using all available resources given a sufficient demand).

Figure 2:
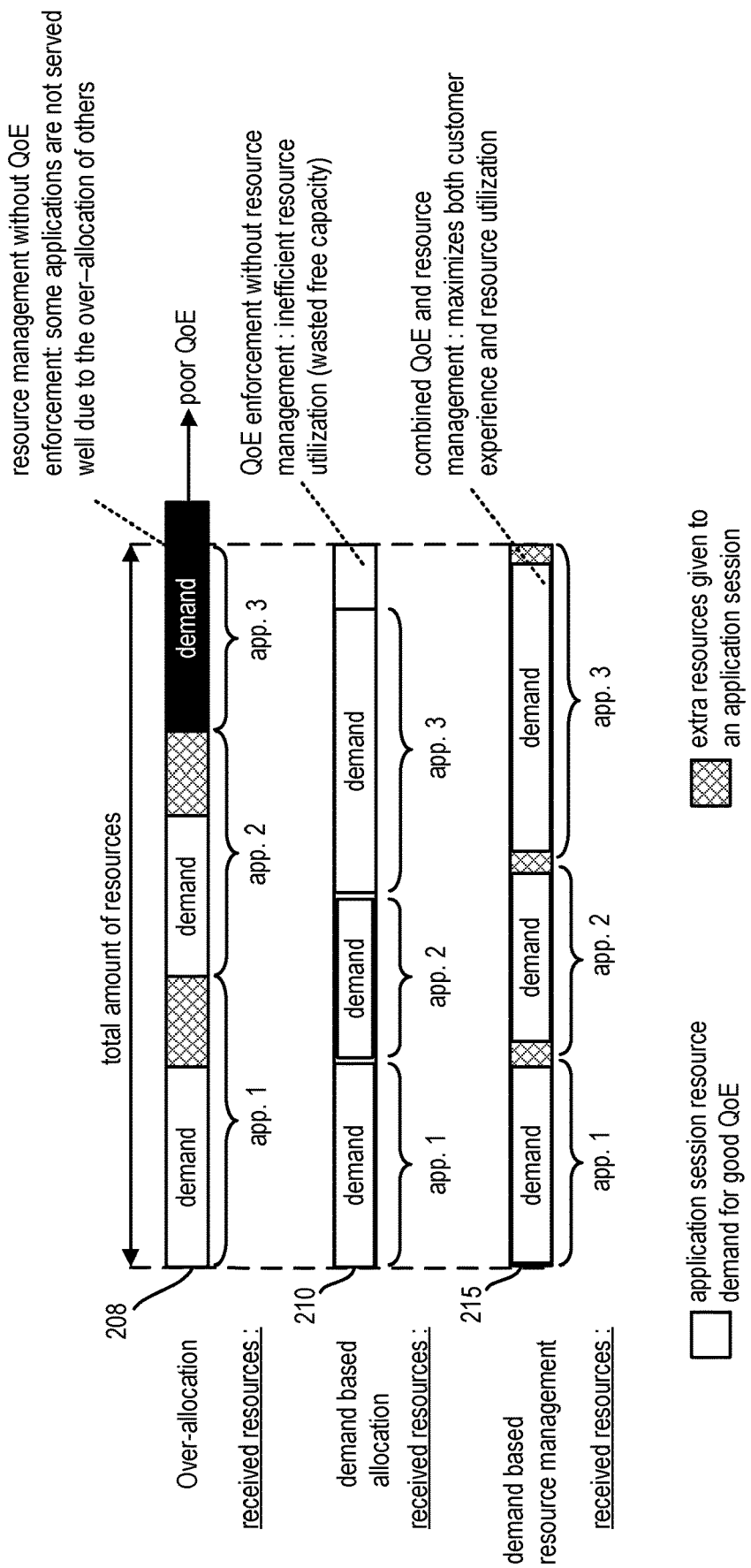
FIG. 2 depicts a plot of QoE management and efficient resource management, in accordance with some example embodiments.
Figure 3:
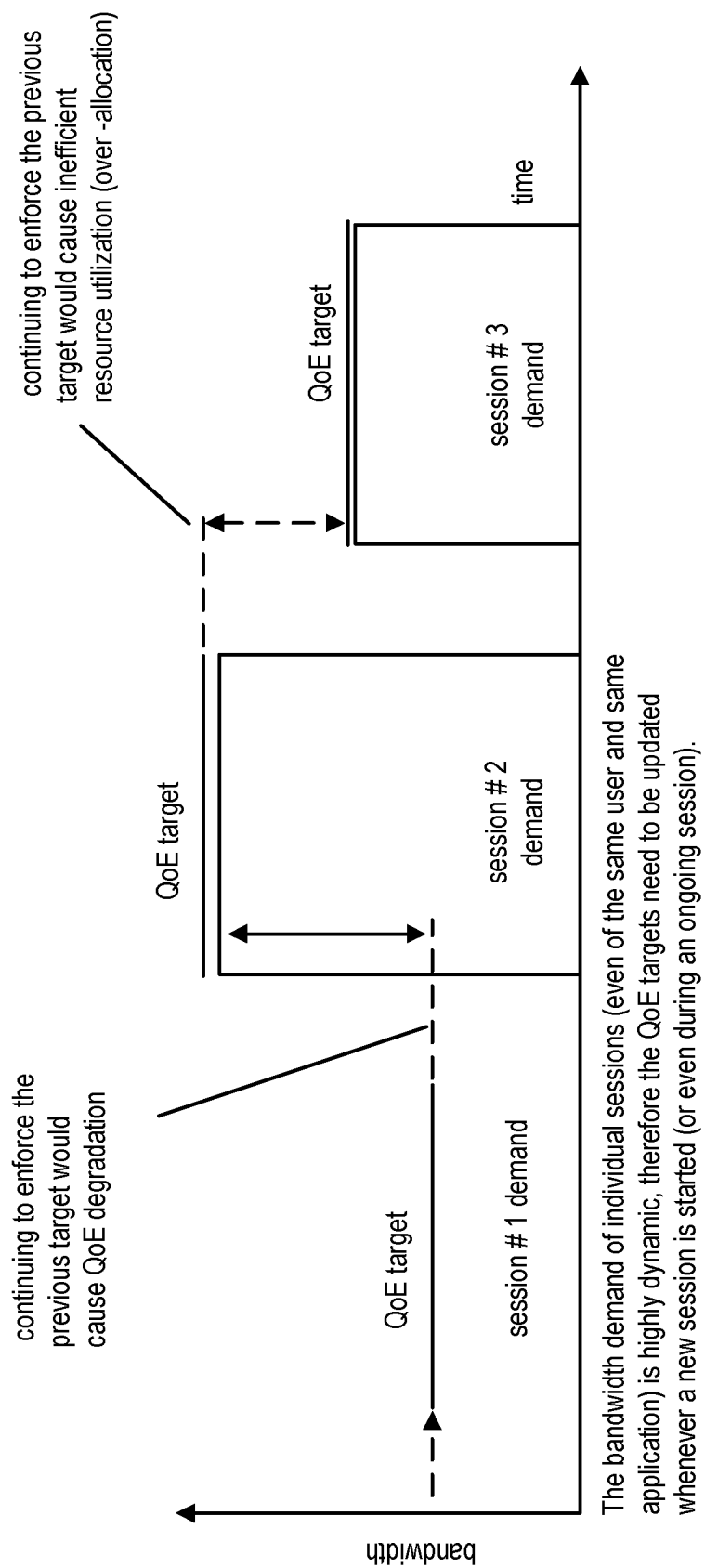
FIG. 3 depicts QoE targets such as bandwidth over time for three sessions, in accordance with some example embodiments.

FIG. 2 depicts a plot showing an over allocation 205 of resource to applications 1-3, an inefficient allocation 210 of resources to application 1-3, and a demand based resource management 215 that optimizes the usage of shared resources among the applications 1-3 (thus providing a more optimum utilization of those resources). Due in part to the diversity of the application sessions 1-3, resource demand for consecutive sessions of the same user or service flow (even if they belong to the same application) may be highly different. Some application sessions may significantly change during their lifetime (e.g., due to media rate selection or adaptation of multimedia applications, or due to the user changing the way of interaction with the application), which may dictate intermediate QoE target (or at least QoS parameter value) adaptation. These changes may also need to be adaptively and dynamically followed by the QoE target definitions to maintain good QoE as well as efficient system resource utilization as depicted at FIG. 3, which shows the dynamics of demand over time. To provide adaptive and dynamic QoE enforcement, the enforcement point 104 may, in some example embodiments, detect the initiation of each application session and monitor the session from time to time in order to feed back the current context (or state) of the application as well as network demand for shared resources. As shown in FIG. 3, having a static target can lead to inefficient resource utilization as shown when session 3 is instantiated, which uses far less than the QoE target established for session 2. FIG. 3 thus illustrates a need for a more dynamic or adaptive approach that considers available resources and user plane traffic such as the sessions.

Figure 4:
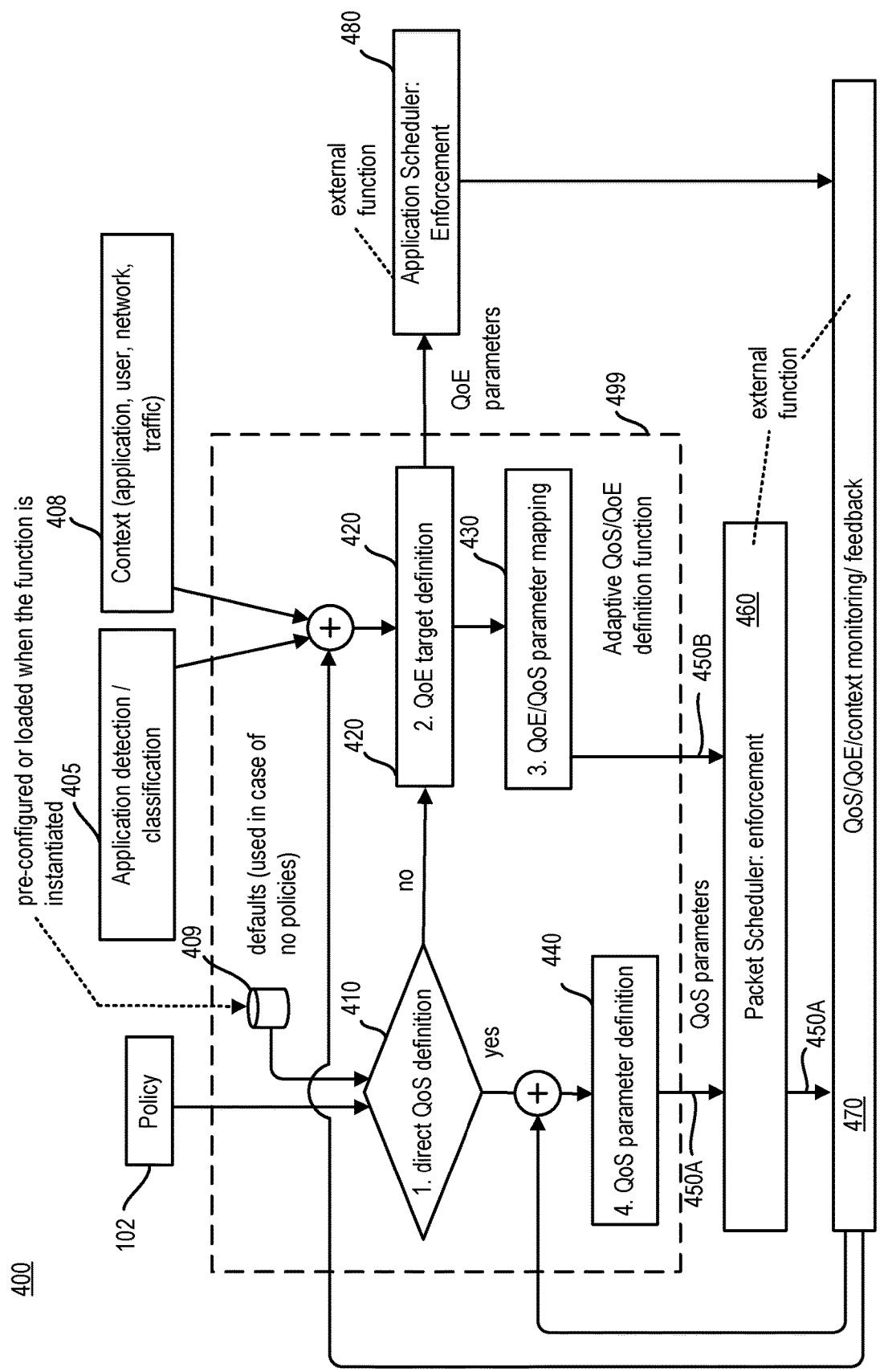
FIG. 4 depicts an example of a system including an adaptive QoS/QoE definition function module, in accordance with some example embodiments.

FIG. 4 depicts a system 400 including a QoS/QoE definition function module 499, in accordance with some example embodiments. The QoS/QoE definition function 499 may, as noted, be implemented as part of an enforcement point, such as enforcement points 104, although the QoS/QoE definition function module 499 may be implemented at other locations as well. The QoS/QoE definition function 499 may provide policy and context based adaptive definitions of one or more QoE targets ("QoE target definition") and QoS parameter mapping, in accordance with some example embodiments.

The QoS/QoE definition function module 499 may receive policy information (e.g., QoS/QoE related), from the policy server 102 as well as other sources. For example, the policy at policy server 102 may include policy levels, such as the above-noted hierarchical abstraction levels, such as intent level policy, customer experience level policy, and/or network level policy.

In some example embodiments, the system 400 may include an application detection and classification module 405. The application detection and classification module 405 may detect and classify an application session as being of a certain type. For example, at the initiation of a session, the application detection and classification module 405 may detect that an application is a video streaming session related to a certain OTT application. The applications may be classified into for example one of a plurality of application types, such as (A) real-time multimedia, (B) stored media, (C) interactive data, (D) messaging/transactional, (e) Background, and/or other types of classification.

In some example embodiments, the system 400 may include a context module 405. The context module 405 may gather or receive a context for application sessions. When an application is initiated, the context module 405 may obtain (for example, monitor, receive, and/or the like) context information regarding the application, user, network, traffic, and/or the like. Moreover, the context module 405 may continue to obtain context information while the session for an application is running to determine the current context of the application session. For example, at the initiation of a session, the context module 405 may obtain context information indicating that a video streaming application session has a context of 720 progressive video quality, the network state or traffic, and/or the like. Later, the context module 405 may determine that the context of the session for the video streaming application session has changed (for example, the user may have selected 1080 progressive video quality and frequent "buffering" causing interruption in the viewing of the video, the network is now congested, and/or the like). In this example, the context module 405 would obtain the current context of the session for the video streaming application, and provide that current context to the QoS/QoE definition function module 499.

In some example embodiments, the system 400 may include one or more default policies stored at a database 409. The default policies may be used in addition to, or instead of, the policies at 102.

When a session is initiated and the underlying application type cannot be determined, the QoS/QoE definition function module 499 may at 410 determine that the session should be handled with a QoS threshold target, rather than a QoE. For example, if the session relates to an encrypted virtual private network, the QoS/QoE definition function module 499 and/or the application detection/classification module 405 may not have access to the user-plane traffic to gain sufficient application-level insight in order to classify the application type and provide meaningful QoE threshold targets. In this example, the QoS/QoE definition function module 499 may apply a QoS parameter at 440, such as a packet delay, a bandwidth, and/or the like for the session, and provide at 450A the QoS parameter to a packet scheduler 460 for enforcement.

In some example embodiments, the QoS/QoE definition function 499 may identify QoS parameters that are relevant to predetermined service verticals (e.g., a telecommunications service, OTT, internet of things, vehicle to everything, and/or the like). These QoS parameters may be stored as policy at 102.

When an application session is initiated, the QoS/QoE definition function module 499 may receive, from application detection/classification module 405, an application classification, receive policy from 102 and/or 409, and/or receive context information from 408. The QoS/QoE definition function module 499 may, based on the received information, define and/or provide, at 420, a QoE target. The QoE target may be provided to an application scheduler 480 for enforcement. For example, if the policy 102 indicates that QoE or QoS level management is needed given the context information, QoE target definition and/or QoE/QoS parameter mapping may be performed at 420 and 430. The QoE target definition 420 may identify the QoE targets applicable to the application session and define the values for the parameters. The QoE parameters and their target values may, as noted, be adaptively defined based on the characteristics of the application session, the corresponding policy, and the local context. When the application scheduler 480 is in system 400, the system 400 may be able to take over and enforce the QoE parameters (for example, the parameters from 420 may be fed to the application scheduler 480 for enforcement).

With respect to QoS parameter definition, the QoE targets may be mapped at 430 as noted above to QoS parameters that are suitable for direct enforcement via packet schedulers or other traffic management mechanisms. An example of QoS parameters are shown at Table 1 below.

TABLE 1

| | Parameter | Description/Comment |
|---|---|---|
| Telecommunications (e.g., native voice/video) | Delay | Target for voice: 100 milliseconds (3GPP TS 23.203 QCI1 for conversational voice) |
| | Jitter | Target for voice: 0.5-1 milliseconds |
| | packet loss | Target for voice: $0\text{-}10^{-2}$ (3GPP TS 23.203 QCI1 for conversational voice) |
| | minimum throughput (capacity grant) | Based on the codec parameters (e.g., AMR voice codec ~12.2 kb/s) |
| OTT | target throughput (capacity grant) | Bandwidth required for good QoE (ideally this should be the service provided for the application) |
| | minimum | Bandwidth required for acceptable QoE (below |

TABLE 1-continued

| Parameter | Description/Comment |
|---|---|
| throughput (capacity grant) | that the application is unusable so it is better not to serve it at all) |
| scheduling delay budget (per packet) | Amount of time after the packet must be scheduled for transmission (for real time streaming type of applications); may be even provided in each U-plane packet |
| discard (yes/no) | Discard sensitivity |
| priority | Relative priority (~ARP) to resolve conflicting situations when some application demands cannot be served |
| urgency | A marking applied on a per-packet or per-flow basis indicating that the service of the packet/flow should be expedited (i.e., served out-of-order in a non-FIFO way) |

Referring to Table 1, the capacity grant may be a compound parameter that is composed of two parts. The first part may include throughput (e.g., bit rate and/or the like) to be provided. The second part may include minimum scheduling frequency. The minimum scheduling frequency (n×TTI) may provide an additional constraint for the radio packet scheduler on how to smooth the throughput should be achieved in time (e.g., allows no scheduling for a longer time compensated by a large burst, or requires to be scheduled frequently to achieve the throughput consistently). If omitted, the scheduler may have the complete freedom to operate according its own principles (e.g., Proportional Fair by the radio scheduler).

Moreover, the QoS/QoE definition function 499 may define QoE target values at 420 that may, in some example embodiments, be based on the application session attributes, primarily having the assumption to serve the applications well (e.g., assuming a high-level policy that requires good customer experience for the applications). Nevertheless, meaningful ways to relax the requirements in case of heavy congestion are also provided for different application types.

The application scheduler 480 may, in some example embodiments, provide an additional layer of QoS/QoE enforcement and resource management. This additional layer may be used in addition, such as on top of, traditional or existing packet level mechanisms. The additional layer may be configured to understand the user-plane traffic on a higher abstraction level and enforce application specific QoE targets and autonomously defined QoS/QoE rules on a dynamically identified traffic mix. The additional layer may be configured to have the capability of interworking with traditional packet schedulers to enhance or maximize the efficiency of QoS/QoE management. The application scheduler may control (for example, take over responsibility for) resource management from congested resources to effectively pull the congestion point from an external bottleneck into the application scheduler's internal scheduler where the resource bottleneck may be resolved by for example redistributing available resources among competing flows and applications according to QoE requirements or the QoS principles selected by the policies. Congestion control may thus be incorporated into both QoS and QoE enforcement, which may be an integral and/or inseparable capability. The application scheduler 480 may be included in an enforcement point, which may be positioned in the core network, at a radio access network node, and/or at any other location.

The QoS/QoE definition function 499 may map QoE targets provided at 420 to QoS targets, which can be provide at 450B to a packet scheduler 460 for enforcement, in accordance with some example embodiments.

The system 400 also depicts feedback 470, in accordance with some example embodiments. The feedback 470 may include monitored context information that can be used QoS/QoE definition function 499 to determine whether an update to the application session's QoE and/or QoS parameters should be performed. For example, the context and the application session behavior may be highly dynamic over time, so the validity of a given QoS or QoE parameter value may have limited validity over time and thus require re-evaluation (especially if there is a change in the contextual information). A network node may detect changes to contextual information and provide those changes as feedback at 470. As noted, the feedback may result in changes such as increase the bandwidth target due to the user switching to a higher media rate video or increase the download time target of interactive applications in case of congestion.

To illustrate further, the QoS/QoE definition function module 499 may receive an external high-level policy that indicates a requirement for smooth playback for online video applications. The QoS/QoE definition function module may additionally receive application detection information 405 that indicates the start of a video application. The QoS/QoE definition function module 499 may also receive the identity of the TCP/IP flows (e.g., ports, IP addresses, and/or the like) that transfer the video data for the detected session. Although some of the examples refer to the policy being received at session establishment, the policy may be received beforehand as well. The QoE/QoS definition function module 499 may access the policies and determine that there is a valid policy for the newly detected video application session. At 410, the QoE/QoS definition function module 499 decides that the policy required is formulated on the customer experience (high abstraction) level. As such, the QoE/QoS definition function module 499 may proceed to 420 for the session such as the video. For example, the QoE high level policy may comprise the video should start within 2 seconds and should not stall. At 430, QoE/QoS definition function module 499 may map these QoE target(s) to a QoS target. The mapping considers application context indicating that the video is just starting up (e.g., video is within its pre-buffering phase during which content is downloaded but the playback is not yet started). Based on the context and QoE targets, the QoE/QoS definition function module 499 may define a 5 megabits per second initial bandwidth so that the video can complete its pre-buffering phase within the determined QoE target. This QoS target may be passed on to a packet scheduler that understands and is capable of enforcing the bandwidth target. After 1.5 seconds for example, the QoE/QoS definition function module 499 may receive a context update indicating that the video playback has started. This changed context may trigger a change in the QoE/QoS mapping at 430. As the pre-buffering phase is over, the video may need less bandwidth, so satisfying the QoE target with respect to stalling may be achievable with a 3 Mb/s bandwidth. The new value may be passed to the packet scheduler to enforce it. Next, the QoE/QoS definition function module 499 may receive yet another context change indication informing about increased video resolution. As a response, the QoE/QoS definition function module 499 may change the QoE/QoS mapping at 430 to satisfy the same QoE target of no stalling but now a new QoS target of 4.5 megabits per second may be needed. The new value may then be passed to the packet level scheduler.

In another example, the QoE/QoS definition function module 499 may receive a policy that requires VPN connections to be given 3 Mb/s bandwidth and a latency budget of 30 milliseconds. Subsequently, the QoE/QoS definition function module 499 may receivean application detection information about a VPN connection being established including the protocol level identifiers that enable identifying all packets that belong to the VPN connection. at 410, the QoE/QoS definition function module 499 may access the policies and may then find that there is a policy matching the VPN application. This policy may request low level QoS targets, so the QoE/QoS definition function module 499 may skips 420 and 430 and proceed to 440 where the required QoS targets (3 Mb/s bandwidth, 30 milliseconds latency) can be passed at 450A to a packet scheduler 460 capable of enforcing the target.

The minimum resource requirement of an individual application session that enables acceptable QoE depends on the application type and the attributes of the content being requested. Giving fewer resources to the session may result in QoE degradations and possibly termination of the session by the user. On the other hand, increased resource allocation beyond a level also has a diminishing marginal utility in terms of the achieved QoE. There may be a certain (application and session specific) limit beyond which QoE could not be improved no matter how many more resources are given. Any extra resources are nonetheless utilized by the applications due to the greedy nature of the transport layer protocols (such as TCP, Quick UDP Internet Connection, and/or the like) that are most commonly used by application s including OTT applications. Therefore, the system resources (e.g., radio physical resource blocks or transport link capacity) may be utilized fully without being distributed optimally in terms of the number of connections or sessions served with good QoE (this is the tendency in systems without application and QoE management or awareness). A goal of the combined QoE/resource management may be to arbitrate the resource allocations in a way that no application session gets under-allocated (which may cause compromised QoE) due to serving another session above their demand.

As explained above, the resources a given application session may need depends on the application type and the attributes of the content being requested (or created). In case of multimedia applications, an important resource is the bandwidth and the minimum required amount is the media rate of the video/audio (plus protocol overheads). Additionally, at the beginning of the session more bandwidth may be required to speed up the pre-buffering (e.g., the time until the content starts to play). In case the session does not receive enough bandwidth, it eventually leads to poor QoE (stalling or switching to low resolution format). Giving more bandwidth, on the other hand, may not provide better multimedia experience once seamless playback is guaranteed (the extra bandwidth might be spent for accumulating more data in the playout buffer that has no added value for QoE as long as the buffer is not depleted).

Figure 5:
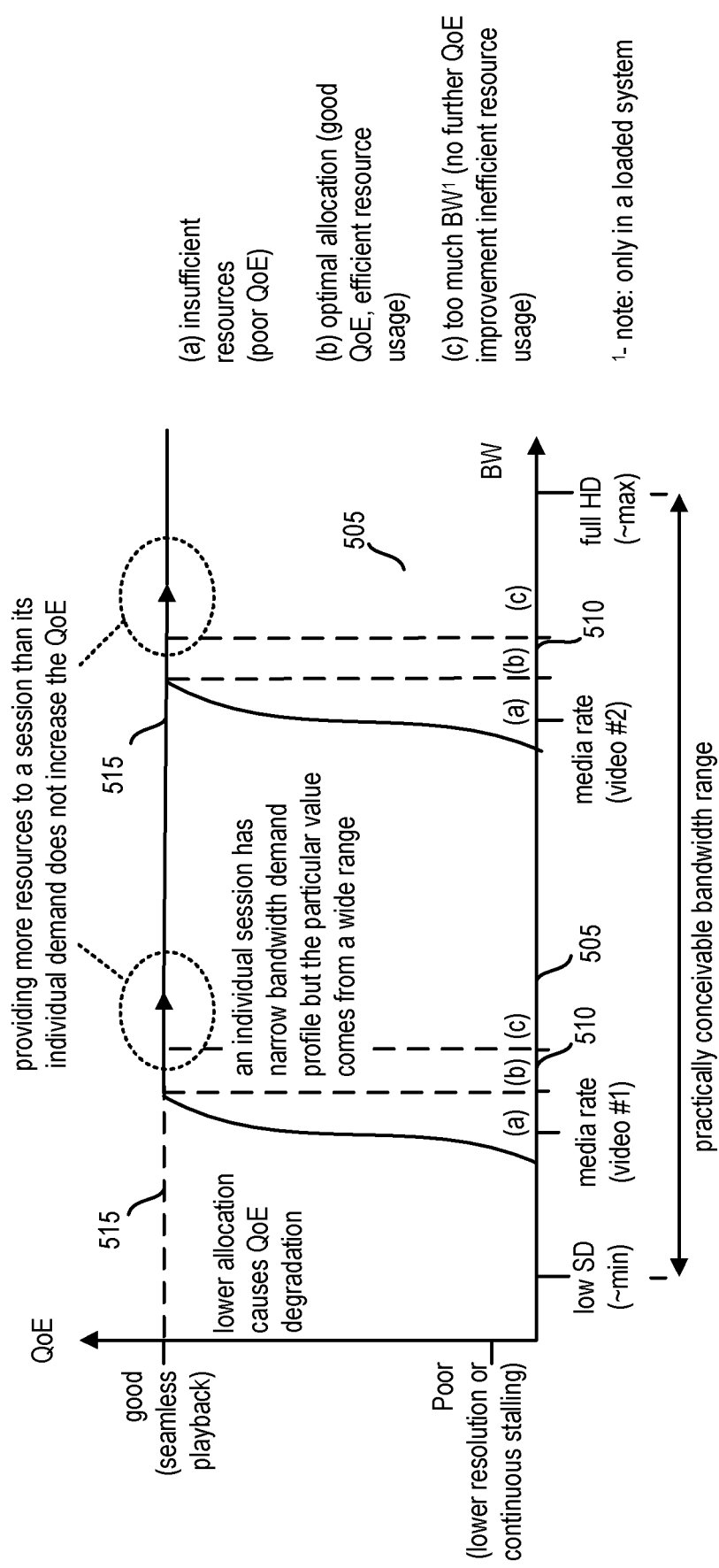
FIG. 5-FIG. 6 depict plots of QoE versus bandwidth, in accordance with some example embodiments.

Multimedia application sessions may have a narrow bandwidth profile around the media rate, so increasing the bandwidth allocation above the media rate may quickly stop delivering QoE improvement, whereas dropping just below the rate may cause quality problems as shown at FIG. 5. The media rate distribution of the individual sessions, however, may be considered highly dynamic, so each individual session may be a particular realization from a possible wide range of media rates (e.g., from standard definition to full HD). Under light load (e.g., the cumulative demand in the system is less than the corresponding resources that serve them), the objective may be to transfer the data as fast as possible without imposing demand based limits on the application sessions. Therefore, the range (c) 505 at FIG. 5 may be reached when there is low load and it only starts to be treated as too much bandwidth when the system is loaded and the applications are competing for the resources (in that case (b) 510 is the desired range for the sessions whereas case (a) 515 is to be avoided unless there is such heavy load that not all application session may be kept in their range (b)).

A similar analysis may be performed for applications in which the user interactively requests some data to be downloaded and viewed, such as with web browsing or map applications. In these cases, the customer experience may depend on delivering the data within a short time that feels interactive enough for the user. An important resource may again be bandwidth, and the amount of bandwidth may depend on how much data is downloaded in an interaction (e.g., click or tap on the GUI) and what is the download time that feels interactive—which depend on the exact application and the content. When the application has less bandwidth, the application may still deliver the content, but the application delivers it at a slower rate. As opposed to multimedia applications, there is no exact hard lower limit on the bandwidth (such was the media rate) as slower download may not compromise the quality of the downloaded content. Moreover, applications may tend to run optimized display strategy so that the content is started to be shown before it is fully downloaded (especially if the whole content consists of multiple smaller objects like web pages). Here, there may be a soft low limit as users may not be willing to wait very long for the content. Nevertheless, there may be some elasticity in the download time target and thus the amount of required bandwidth to achieve it. This elasticity may be taken into account and thus exploited by the QoS/QoE system disclosed herein to serve more applications when a resource (such as link or radio cell) is congested or limited and there are many competing application sessions as shown at FIG. 6.

Figure 6:
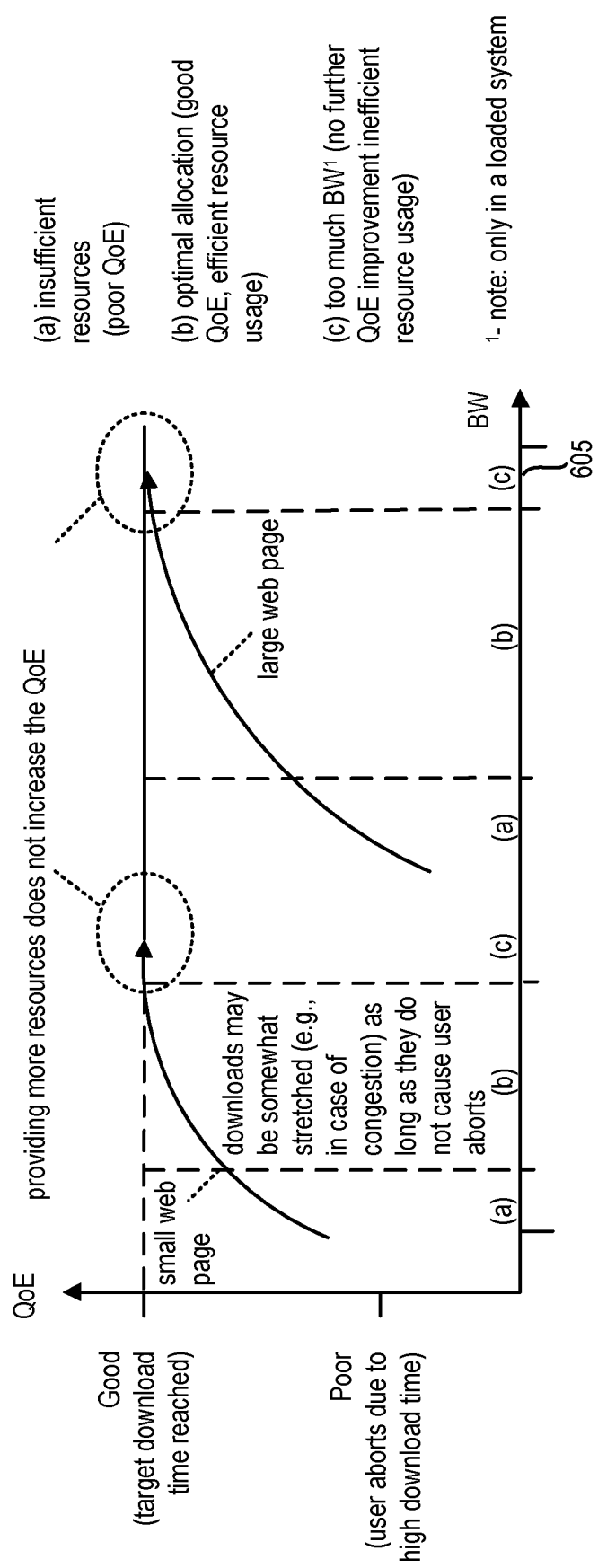

In FIG. 6, the range (c) 605 represents an over-allocation when there is competition among the application sessions for the available resources (e.g., loaded system). Increasing the bandwidth allocation for an interactive session beyond the point when a reasonable download time is reached again may not improve the QoE further. There are at least two reasons for that. First, the experienced interactivity (short download time combined with smart device side display strategy) may reach the limit of human observation (i.e., interacting with the device feels instant or tactile already). In this case, more bandwidth can be utilized by the connections but they might not bring any additional benefit. Second, the achievable download time not only depends on the bandwidth provided by the network but may also depend on factors that may not be counterbalanced by more bandwidth, such as the intrinsic end-to-end round-trips times, the protocol data transfer mechanisms (such as TCP slow start), external conditions such as Internet/server side load, device limitations, individual radio coverage problem, and/or the like. When this is the case, more bandwidth allocation may not even result in higher achieved throughput.

To overcome the challenge of having a high number of different applications (e.g., in applications, services, including OTT services), the QoE/QoS system including the application detection/classification module 405 may classify applications may be classified into a pre-determined set of classification groups. For example, when a session of an application is initiated, application detection/classification module 405 may detect the session and classify the application. Each group may be defined to have a common characteristics with regard to the relevant QoE influence factors (e.g., what are the important parameters and attributes that have impact on the achieved QoE for a given application session). An example of a classification scheme is shown in Table 2 below. In the example classification scheme, five groups labelled (A) to (E) each have a common behavior.

TABLE 2

Real time multimedia
Transfers the audio/video frames of a live capture, i.e., content is disseminated at the same pace it is generated. Sensitive to jitter and discards (as they compromise the quality of the decoded content) and requires low delay (to maintain interactivity). Examples: Viber/Skype (voice/video calls), WhatsApp (voice calls).
Stored multimedia
Delivers a multimedia file that is already available at the time of the request (often in different resolutions and formats). Requires short time to play (pre-buffering time), no stallings and decent resolution (matching the device capabilities). Examples: YouTube, Netflix.
Interactive data
Generates demand (download/upload) in bursts with significant idle periods in between (mostly personalized content). Requires short download (or upload) time. Examples: web browsing, social sites (excluding video/voice parts), map views, cloud based productivity tools, Evernote.
Messaging/transactional
Generates a few packets at a time (i.e., insignificant bandwidth requirement). Requires low latency (round-trip time) and no loss for high interactivity. Examples: chat, real time gaming.
Background
Data transfer either running in the background (completely invisible to the user) or when the user is aware of its progress but does not have strict expectation about the completion time (i.e., no busy waiting on the content like after requesting a web page). The user still needs to feel that the process is progressing and it is not stuck. Examples: pushed content (email, Snapchat message, where the user is only notified when the content is already downloaded in background), Dropbox, Box, SW updates.

The application detection/classification module 405 may detect applications in a variety of ways. For example, for a set of popular applications, application detection/classification module 405 may include detection logic for user plane packet monitoring (e.g., by the correlation of IP addresses, DNS query/response messages, TLS handshake information, URLs, and/or the like). This may lead to the detection of a specific application (e.g., YouTube), which can be mapped to a specific application classification. Non-dedicated applications may be classified based on the traffic patterns generated by the application itself (e.g., specific attributes of HTTP adaptive streaming, VoIP/video calls, messaging, etc. can be identified without knowing the exact identity of the application). Additionally or alternatively, the application's behavior may be matched to already profiled applications to identify that a new application generates the same kind of traffic as a known one thus it is likely that the similar characteristics apply.

The QoS/QoE definition module 497 may quantify QoE targets, such as download time, bitrate, and/or the like, and this quantification may be based on pre-defined attributes and/or on-the-fly detected attributes. For example, for certain applications the correlation between the user satisfaction (such as the subjective experience) and the QoE targets may be monitored and generally applicable values ranges/limits may be determined (e.g., the download time for web pages that is usually accepted without causing frustration can be identified through crowdsourcing campaigns). Such targets may be configured in the policies. Moreover, certain QoE targets may require the detection of session metadata, such as the media rate of the video in order to quantify the amount of bandwidth it requires for smooth playback. This may dictate obtaining session establishment metadata for the network (e.g., from protocols such as SIP or RTSP), control-plane signaling (for native services), packet metadata (e.g., video media rate and codec information from manifests or from the metadata section of the video file being downloaded), or from any external source (e.g., signaling from the content provider or from the consumer application).

Due to the increasing adoption of end-to-end encryption including virtual private networks, it may not be possible to directly access to the required attributes directly from user-plane packet monitoring. Instead, real time traffic profiling mechanisms may be used that are coupled with enforcement actions. Such actions may temporarily provide the application with sufficient resources (referred to as incubation) so that the application exhibits traffic delivery patterns that are characteristic to the particular session. An example of this is the HTTP(S) streaming that is used by most of the stored multimedia services. These applications download multimedia data as it is consumed by the player (e.g., with a rate that is close to the media rate in order to avoid pre-buffering excessive amount of data). Incubation enables the multimedia session to establish a download rate that is comfortable for the specific content, which can be measured during the incubation period and enforced later on.

Figure 7:
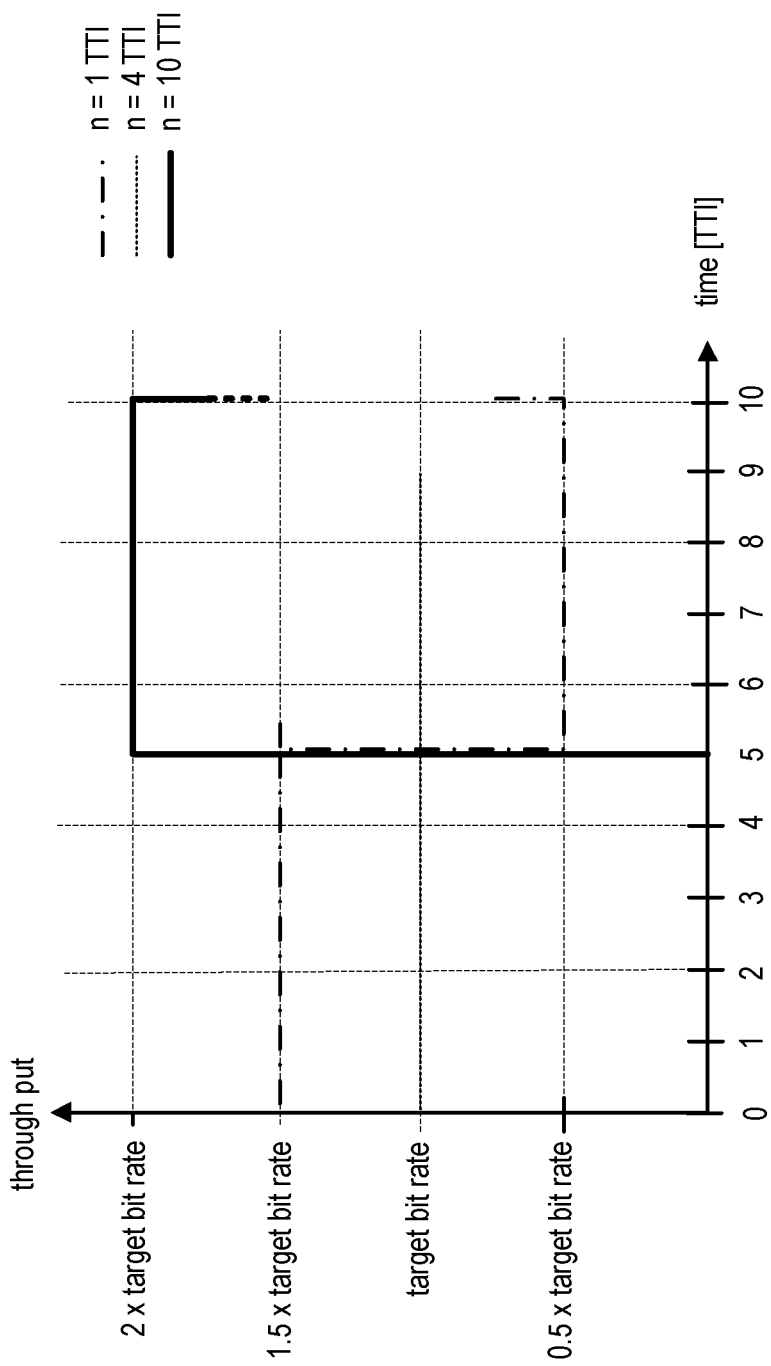
FIG. 7 depicts a plot of a capacity grant, in accordance with some example embodiments.

FIG. 7 depicts an example of how the same target throughput may be realized by a scheduler having different constraints on the smoothness. The n=1 TTI configuration may require that the target throughput is provided on the TTI level, which is a very strict constraint and may have a high cost in the amount of (physical) resources controlled by the scheduler (e.g., in case of a radio scheduler, it would not able to optimize for TTI level channel diversity gain). Relaxing the scheduler constraint so that the target throughput is achieved on a longer average (several TTIs) leaves sufficient short-term TTI scale optimization freedom for schedulers to achieve considerable gain while still providing enough throughput stability for most OTT applications. Some service verticals, however, may require having a strict scheduling principle even though it costs in resource utilization. With respect to mapping QoE targets to QoS parameters at 430, due to the narrow service boundaries of native telecommunications voice and video, the QoE requirement of such services can be mapped directly to established QoS parameters and values as shown at FIG. 8. For IMS voice and video, the codec rate is known from signaling and session establishment and requires no indirect detection mechanism to collect (e.g., packet monitoring). For applications or services such as an OTT applications/services, the mapping/conversion of the QoE targets per each application type (except for best effort as it has no QoE level targets) to QoS parameters is depicted at FIG. 9. The values of the QoS parameters may not be statically defined but calculated dynamically based on the context of the user's application and the network resource status. Table 3 below provides a summary of the OTT services classifications listed at FIG. 9, such as (A) Real time multimedia, (B) Stored Media, (C) Interactive Data, (D) Messaging/transactional, and (E) Background.

TABLE 3

(A) Real time multimedia
Minimum bandwidth corresponding to the content media rate (lower rate causes degradation through increased delay, dropped frames and decoding errors).
Bandwidth requirement is not subject to highly dynamic and abrupt changes.
Tight scheduling for steady throughput and low jitter (sensitive to jitters).
Low delay (in the range of conversational voice/video targets).
No loss (discards cause decoding errors and QoE degradation).
(B) Stored multimedia
Minimum bandwidth corresponding to the content media rate (lower rate causes degradation through stalling or switching to low resolution).
Occasionally higher target bandwidth to enable accurate demand profiling and to boost pre-buffering through incubation.
Bandwidth requirement is not subject to highly dynamic and abrupt changes.
Less tight scheduling than real time multimedia, throughput targets to be achieved over longer (at most end-to-end RTT) averages, not sensitive to jitter.
No loss (discards cause throughput degradation and potential QoE degradation via end-to-end transport layer actions).
(C) Interactive data
Highly dynamic target bandwidth depending on content size and target download time (application and user context specific).
May require no (or low) minimum bandwidth due to content elasticity (i.e., content may already be displayed to the user while downloading).
No loss (discards cause increased completion time and data starving at the application layer such as delay of specific objects).
(D) Messaging/transactional
Low latency (and high priority).
No loss (discards cause timeouts, delayed or even lost messages).
Urgency may be applied to important packets (application specific).
(E) Background
Best effort service (may have a minimum throughput requirement).
Service goal is to avoid flow level degradation such as TCP timeouts.

The QoE targets may be converted to bandwidth (minimum or target capacity grant) and delay requirements, whereas avoiding loss is a requirement due to the sensitivity of end-to-end transport layer protocols (such as TCP or QUIC). A key attribute for deriving the values is given in FIG. 9 (e.g., for (B) stored multimedia) the bandwidth part of the minimum capacity grant should come from the media rate of the video session, whereas the scheduling frequency part (i.e., the averaging time for achieving the throughput) may be within the range of one end-to-end RTT. Both the media rate attribute and the RTT may be detected through user-plane packet monitoring, metadata extraction, traffic pattern profiling mechanisms. The obtained media rate and RTT values may change during the video session (e.g., due to video rate adaptation, radio channel quality change, user and traffic mix fluctuations, etc.), which require that the QoS parameters are updated during the session. The frequency of such updates, however, is expected to be on a much longer RTT timescale (20-50 milliseconds) than the packet scheduler TTI level (0.1-1 milliseconds).

Without in any way limiting the scope, interpretation, or application of the claims appearing herein, a technical effect of one or more of the example embodiments disclosed herein may include enhanced performance and usability of applications accessed via wireless networks.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (application scheduler 300IC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any non-transitory computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:
1. A method comprising:
receiving, at an adaptive quality controller, an indication of a classification of an application, when a session of the application is detected, wherein the adaptive quality controller is included in a radio access network node of a cellular network;

receiving, at an adaptive quality controller and in response to the received indication, a policy from a policy server, the policy associated with the classification and context information regarding at least the application;

determining, by the adaptive quality controller and based on the received policy and the context information, a quality of experience target for the session;

mapping, by the adaptive quality controller, the quality of experience target to a quality of service parameter; and providing, by the adaptive quality controller, the quality of experience target to an application scheduler and/or the quality of service parameter to a packet scheduler.

2. The method of claim 1, further comprising:
receiving, during execution of the session, feedback information including updated context information, wherein the adaptive quality controller is further included at a core network of the cellular network.

3. The method of claim 2, further comprising:
determining, based on the updated context information, an updated quality of experience target for the session.

4. The method of claim 3, further comprising:
mapping, based on the updated context information, the updated quality of experience target to an updated quality of service parameter.

5. The method of claim 1, wherein the determining and the mapping is performed during the session to adaptively update the quality of experience target and/or the quality of service parameter.

6. The method of claim 1, wherein the context information includes at least one of a location of a user equipment, a state of the application, a time, a type of radio access, or a network demand for shared resources.

7. The method of claim 1, wherein classification comprises at least one of a real-time multimedia classification, a stored media classification, an interactive data classification, a messaging classification, a transactional classification, or a background classification.

8. The method of claim 1, wherein when the classification indicates the application does not provide visibility into user-plane traffic or the policy indicates there is no need to determine the quality of experience target, the adaptive policy controller bypasses the determining of the quality of experience target and proceeds to determining the quality of service target.

9. An apparatus, comprising:
at least one processor; and
at least one memory including computer program code, the at least one memory and the computer program code configured to, with the at least one processor, cause the apparatus to perform at least the following:
receive an indication of a classification of an application, when a session of the application is detected, wherein the apparatus is included in a radio access network node of a cellular network;
receive, in response to the received indication, a policy from a policy server, the policy associated with the classification and context information regarding at least the application;
determine, based on the received policy and the context information, a quality of experience target for the session;
map the quality of experience target to a quality of service parameter; and
provide the quality of experience target to an application scheduler and/or the quality of service parameter to a packet scheduler.

10. The apparatus of claim 9, wherein the apparatus is further configured to at least receive, during execution of the session, feedback information including updated context information, wherein the adaptive quality controller is further included at a core network of the cellular network.

11. The apparatus of claim 10, wherein the apparatus is further configured to at least determine, based on the updated context information, an updated quality of experience target for the session.

12. The apparatus of claim 11, wherein the apparatus is further configured to at least map, based on the updated context information, the updated quality of experience target to an updated quality of service parameter.

13. The apparatus of claim 9, wherein the apparatus is further configured to determine and map during the session to adaptively update the quality of experience target and/or the quality of service parameter.

14. The apparatus of claim 9, wherein the context information includes at least one of a location of a user equipment, a state of the application, a time, a type of radio access, or a network demand for shared resources.

15. The apparatus of claim 9, wherein classification comprises at least one of a real-time multimedia classification, a stored media classification, an interactive data classification, a messaging classification, a transactional classification, or a background classification.

16. The apparatus of claim 9, wherein when the classification indicates the application does not provide visibility into user-plane traffic or the policy indicates there is no need to determine the quality of experience target, the adaptive policy controller bypasses the determining of the quality of experience target and proceeds to determining the quality of service target.

17. The apparatus of claim 9, wherein the apparatus comprises an adaptive quality controller.

18. A non-transitory computer-readable storage medium including program code which when executed causes operations comprising:
receiving, at an adaptive quality controller, an indication of a classification of an application, when a session of the application is detected, wherein the adaptive quality controller is included in a radio access network node of a cellular network;
receiving, at an adaptive quality controller and in response to the received indication, a policy from a policy server, the policy associated with the classification and context information regarding at least the application;
determining, by the adaptive quality controller and based on the received policy and the context information, a quality of experience target for the session;
mapping, by the adaptive quality controller, the quality of experience target to a quality of service parameter; and
providing, by the adaptive quality controller, the quality of experience target to an application scheduler and/or the quality of service parameter to a packet scheduler.

* * * * *